UNITED STATES PATENT OFFICE.

OSCAR VON SLAMA, OF JERSEY CITY, NEW JERSEY.

COMPOSITION FOR USE AS ORNAMENTAL MOLDINGS, &c.

SPECIFICATION forming part of Letters Patent No. 474,865, dated May 17, 1892.

Application filed August 18, 1891. Serial No. 402,985. (No specimens.)

*To all whom it may concern:*

Be it known that I, OSCAR VON SLAMA, a citizen of Austria-Hungary, residing at Jersey City, in the county of Hudson and State of New Jersey, have invented certain new and useful Improvements in Plastic Compositions for Use as Ornamental Moldings, &c., of which the following is a specification.

This invention relates to an improved plastic composition which is intended for use for the purpose of making ornaments for furniture, frames for mirrors and pictures, burial-caskets, and the like; and the invention consists of a plastic composition composed of sulphate of lime, dextrine, soluble glass, and vegetable fibers, which composition is prepared in the following manner and proportions:

A forty-per-cent. solution of dextrine in water is mixed with ten parts of soluble glass, (silicate of soda.) To this solution is added from forty to sixty parts of sulphate of lime (plaster-of-paris) until a thickly-flowing mass is obtained. With this mass vegetable fibers are thoroughly mixed. The mass is then run into the molds. After the mass has set in the molds it is removed from the same and slowly dried by exposure to a draft of air of ordinary temperature or in a room heated to a temperature of 35° to 45° centigrade.

When the composition is to be used for outdoor ornamentation, it is coated by a solution of ceresin in alcohol, by which it becomes water-proof.

The soluble glass serves to harden the plaster-of-paris in the composition, while the dextrine retards the setting of the same. The vegetable fibers impart to the composition a certain degree of consistency and renders it less liable to crack or break.

To give the articles any required color, they may be coated with a suitable color, so as to impart thereto the required character for which the ornaments or articles are used.

Having thus described my invention, I claim as new and desire to secure by Letters Patent—

The plastic composition herein described, composed of dextrine, sulphate of lime, silicate of soda, and vegetable fibers, mixed in about the proportions set forth.

In testimony that I claim the foregoing as my invention I have signed my name in presence of two subscribing witnesses.

OSCAR VON SLAMA.

Witnesses:
PAUL GOEPEL,
A. M. BAKER.